(12) United States Patent
Cobanoglu et al.

(10) Patent No.: US 11,460,959 B2
(45) Date of Patent: Oct. 4, 2022

(54) LARGE AREA TOUCH FABRIC

(71) Applicant: Sanko Tekstil Isletmeleri San. Ve Tic. A.S., Inegol-Bursa (TR)

(72) Inventors: Ozgur Cobanoglu, Inegol-Bursa (TR); Deniz Iyidogan, Inegol-Bursa (TR); Leyla Zengi, Inegol-Bursa (TR); Adil Berk Karakaya, Inegol-Bursa (TR)

(73) Assignee: Sanko Tekstil Isletmeleri San. Ve Tic. A.S., Inegol-Bursa (TR)

( * ) Notice: Subject to any disclaimer, the term of this patent is extended or adjusted under 35 U.S.C. 154(b) by 0 days.

(21) Appl. No.: 16/696,202

(22) Filed: Nov. 26, 2019

(65) Prior Publication Data

US 2020/0167017 A1 May 28, 2020

(30) Foreign Application Priority Data

Nov. 28, 2018 (EP) ..................................... 18208800

(51) Int. Cl.
| | |
|---|---|
| *G06F 3/044* | (2006.01) |
| *D06N 3/00* | (2006.01) |
| *G06F 3/041* | (2006.01) |
| *D03D 1/00* | (2006.01) |
| *D02G 3/44* | (2006.01) |

(52) U.S. Cl.
CPC ............ *G06F 3/044* (2013.01); *D02G 3/441* (2013.01); *D03D 1/0088* (2013.01); *D06N 3/0006* (2013.01); *D06N 3/0088* (2013.01); *G06F 3/0416* (2013.01)

(58) Field of Classification Search
CPC ......................... D06N 3/0006; D06N 3/0088
See application file for complete search history.

(56) References Cited

U.S. PATENT DOCUMENTS

| | | | | |
|---|---|---|---|---|
| 2008/0314626 A1* | 12/2008 | Moore | .................. | G06F 3/0445 174/255 |
| 2009/0160800 A1* | 6/2009 | Liu | .......................... | G06F 21/83 345/173 |
| 2009/0309072 A1* | 12/2009 | Hwang | ............... | H01M 4/5825 252/506 |
| 2012/0105370 A1* | 5/2012 | Moore | .................... | G06F 3/044 345/174 |

(Continued)

OTHER PUBLICATIONS

European search report dated Apr. 9, 2019 for EP priority application No. 18208800.5.

(Continued)

*Primary Examiner* — Benjamin X Casarez
(74) *Attorney, Agent, or Firm* — Silvia Salvadori

(57) ABSTRACT

A capacity touch fabric sensor (10) comprising a fabric layer (30) and layer (20) of a highly resistive material coating, the resistive coating layer (20) coating the fabric layer (30), wherein the fabric sensor (10) further comprises a plurality of electrodes (40) superimposed to the fabric layer (30), the plurality of electrodes (40) being electrically coupled with the first layer (20) of resistive material coating, each electrode (40) being electrically connected to an electronic control unit (450), the electronic control unit (450) being configured to evaluate the capacitance variation of the resistive layer that is indicative of a touch event on the capacity touch fabric sensor (10).
[FIG. 1]

15 Claims, 5 Drawing Sheets

(56) References Cited

U.S. PATENT DOCUMENTS

| | | | |
|---|---|---|---|
| 2015/0182384 A1* | 7/2015 | Case-Gustafson | ............................ A61F 13/0203 345/174 |
| 2015/0236754 A1* | 8/2015 | Hofmann | ............. H04B 5/0031 455/41.1 |
| 2016/0209441 A1* | 7/2016 | Mazzeo | ................... G01L 1/142 |
| 2016/0282988 A1 | 9/2016 | Poupyrev | |
| 2016/0283101 A1* | 9/2016 | Schwesig | ................ A41D 1/002 |
| 2016/0328043 A1 | 11/2016 | Moller et al. | |
| 2018/0255842 A1* | 9/2018 | Karagozler | .............. G06F 1/163 |
| 2019/0324574 A1* | 10/2019 | Schooley | ............... G06F 1/3265 |
| 2019/0354242 A1* | 11/2019 | Cobanoglu | ............ D02G 3/441 |
| 2020/0097109 A1* | 3/2020 | Cobanoglu | ........... D03D 1/0088 |

OTHER PUBLICATIONS

International search report dated Dec. 20, 2019 for corresponding International application No. PCT/EP2019/082667.

* cited by examiner

LARGE AREA TOUCH FABRIC

This application is a U.S. utility application which claims priority to and the benefit of European EP18208800.5 filed 28 Nov. 2018, the content of which is incorporated herein by reference in its entireties.

TECHNICAL FIELD

The technical field of the present invention relates to a large area touch fabric.

In particular, the present invention relates to a capacity touch fabric sensor.

BACKGROUND

In the prior art, either 1D or 2D arrays of conducting yarns as sensing elements in a touch pad, or screen printed or laminated discrete ribbons are known and used for creating sensitive touch areas.

Some problems of the state of the art lie in the fact that the use of discrete conducting yarns or printed ribbons, by definition, lowers the total area effectively used for sensing because the actual areas in-between sensing elements are not used to pick up touch events or in other words, these in-between areas are dead regions where no contribution to stimulus acquisition comes from.

Especially in woven fabric form, the touch sensitive sensor elements are always straight lines because squared or rectangular patterns—as is used on solid substrates to make a larger area of the screen contribute to sensing action—cannot be used due to intrinsic properties of weaving process where the yarns run straight.

Document US2016328043 discloses a sensor assembly formed on a flexible substrate, such as a suitable fabric material, with conductive patterns sewn or stitched into the flexible substrate to form an array of sensors. The conductive patterns form nodes and/or electrodes that correspond to positions of individual sensing points. In an implementation, the sensor assembly implements a plurality of touch sensitive sensors arranged to enable detection of distortions in an electrostatic field applied to the array that are measurable as changes in capacitance.

Document US2016282988 discloses an interactive textile that includes non-conductive threads woven with conductive threads to form interactive textile. Non-conductive threads may correspond to any type of non-conductive thread, fiber, or fabric, such as cotton, wool, silk, nylon, polyester, and so forth.

The interactive textile includes a top textile layer and a bottom textile layer. Conductive threads are woven into the top textile layer and the bottom textile layer. When the top textile layer is combined with the bottom textile layer, the conductive threads from each layer form a capacitive touch sensor that is configured to detect touch-input.

During operation, this capacitive touch sensor may be configured to determine positions of touch-input on the grid of conductive thread using self-capacitance sensing or projective capacitive sensing.

When configured as a self-capacitance sensor, a textile controller charges crossing conductive threads (e.g., horizontal and vertical conductive threads) by applying a control signal (e.g., a sine signal) to each conductive thread. When an object, such as the user's finger, touches the grid of conductive thread, the conductive threads that are touched are grounded, which changes the capacitance (e.g., increases or decreases the capacitance) on the touched conductive threads.

An object of the invention is therefore to create a fabric sensor that avoids the dead areas and makes all the fabric area contribute to signal pick-up.

This and other objects are achieved by a fabric sensor according to the independent claim.

The dependent claims delineate preferred and/or especially advantageous aspects.

SUMMARY

An embodiment of the disclosure provides a capacity touch fabric sensor comprising a fabric layer and layer of a highly resistive material coating, the resistive coating layer coating the fabric layer, wherein the fabric sensor further comprises a plurality of electrodes superimposed to the fabric layer, the plurality of electrodes being electrically coupled with the first layer of resistive material coating, each electrode being connected by means of an electrical connection to an electronic control unit, the electronic control unit being configured to evaluate the capacitance variation of the resistive layer that is indicative of a touch event on the capacity touch fabric sensor.

An advantage of this embodiment is that, in such a way, a capacitive touch fabric sensor is created that effectively uses the whole surface area of the fabric as sensor, even though, a limited or discrete number of actual sensing pins or points are connected thereto.

A touch pad with discrete read-out points where the sensitivity is distributed over the whole surface thanks to a very controlled highly resistive coating is therefore created. The use of such a resistive coating for extending the sensitivity of the discrete electrodes over the whole fabric area allows higher precision in position sensitivity compared to the prior art designs where the sensitivity of the sensing elements is limited to themselves but does not extend outwards as the region in-between the sensing elements are dead areas filled with ordinary yarns without sensitivity.

According to an embodiment of the disclosure, a method of detecting a touch event on a fabric sensor, the method comprising:

providing a fabric layer on the fabric sensor;
providing a layer of a highly resistive material coating, the resistive coating layer coating the fabric layer;
providing a plurality of electrodes superimposed to the fabric layer, the plurality of electrodes being electrically coupled with the first layer of resistive material coating;
evaluating capacitance variations provided by the plurality of electrodes;
determining a touch event as a function of capacitance variations provided by the plurality of electrodes.

BRIEF DESCRIPTION OF THE DRAWINGS

The various embodiments will now be described, by way of example, with reference to the accompanying drawings in which.

DETAILED DESCRIPTION

Exemplary embodiments will now be described with reference to the enclosed drawings without intent to limit application and uses.

Figure 1:
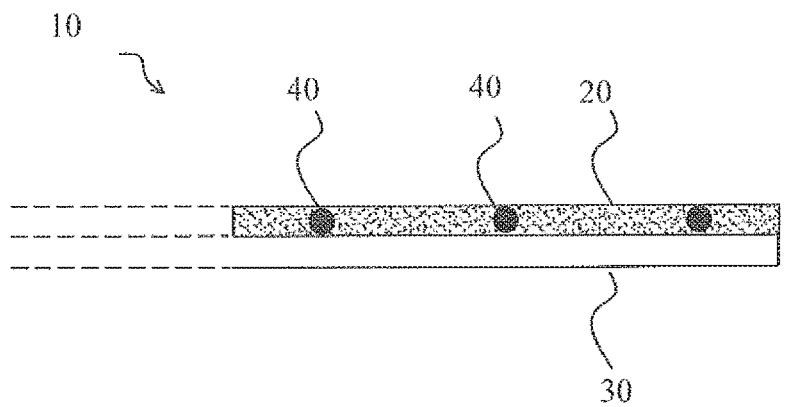
FIG. 1 shows a sectional view of an embodiment of the invention.

The invention will now be described with initial reference to FIG. 1 where a sectional view of an embodiment of the invention, namely a capacitive fabric sensor globally indicated with the reference number 10.

The capacitive fabric sensor 10 operates as a large area touch fabric sensor.

The capacitive fabric sensor 10 comprises a first layer 20 of a highly resistive material coating, the first layer 20 being used to coat a fabric layer 30. The resistive coating may be screen printed on the fabric layer 30.

The capacitive fabric layer 30 may be a woven fabric.

The capacitive fabric sensor 10 further comprises a plurality of electrodes 40 that are preferably printed on the fabric layer 30 and are coated with the first layer 20 of highly resistive material coating.

In general, the electrodes 40 are electrically coupled with the first layer 20 of resistive material coating.

Each electrode is connected by means of an electrical connection 50 to an electronic control unit 450.

The electrical connections 50 may be connecting wires made from a material chosen from steel, nylon with carbon impurities, or copper and can be insulated or non-insulated.

Coating layer 20 is therefore a highly resistive interelectrode coupling medium and is used as a coating on a 1D or 2D array of insulated or non-insulated conducting or low resistive yarns 40 or ribbons printed on the fabric layer 30.

The resistive coating layer 20 may realized, for example, at least in part, with a polymer selected from the group consisting of polyacrylates, polyarnines and polyurethanes.

In another embodiment of the invention, the resistive coating layer 20 may be realized with a biopolymer as described EP18197348.8 by the same Applicant and herein incorporated by reference.

In particular, the biopolymer can be selected from microbial cellulose, microbial collagen, cellulose/chitin copolymer, microbial silk, and mixture thereof, and preferably is microbial cellulose.

An electrically conductive material can be applied to the biopolymer.

Advantageously, the amount of electrically conductive material to be provided to at least part of the biopolymer may be adjusted to obtain, in a precise and reliable way, a desired electrical resistance value.

Said electrically conductive material may be a carbonaceous material, preferably selected from the group consisting of activated carbon, high surface area carbon, graphene, graphite, activated charcoal, carbon nanotubes, carbon nanofibers, activated carbon fibers, graphite fibers, graphite nanofibers, carbon black and mixtures thereof.

In such a way a capacitive touch fabric sensor is created that effectively uses the whole surface area of the fabric 10 as sensor, even though, a limited or discrete number of actual sensing pins or points are connected thereto as electrodes.

A touch pad with discrete read-out points where the sensitivity is distributed over the whole surface thanks to a very controlled highly resistive coating is therefore created.

The described configuration avoids dead areas by making all the fabric area contribute to signal pick-up.

The read-out can be binary or analog, depending on the detail of the application.

The capacitance value of the capacitive touch fabric sensor 10 may be evaluated, for example, by measuring the charging time, or the oscillation frequency of an oscillator (e.g. a Colpitts oscillator), or by other measuring technics known in the art.

Figure 2:
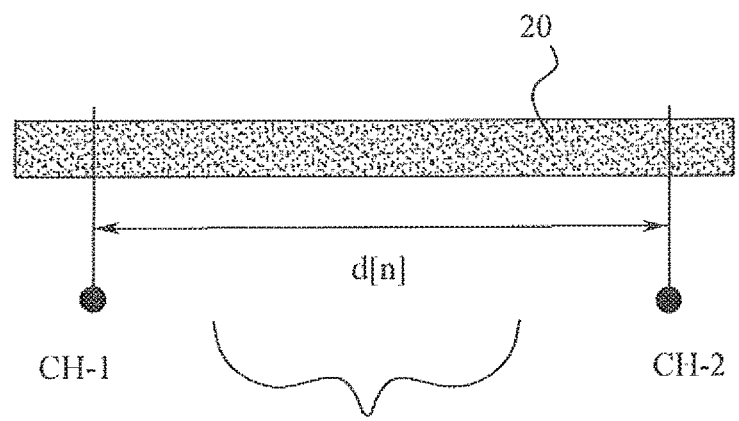
FIG. 2 shows a sectional view of an embodiment of the invention to illustrate a concept of the invention.

FIG. 2 shows a sectional view of an embodiment of the invention to illustrate a concept of the invention.

In FIG. 2, two electrodes in electrical contact with the coating layer 20 and separated by a distance d[n] are represented.

The two adjacent electrodes provide two distinct electrical binary read-outs signals CH-1 and CH-2. In between the electrodes, the resistive coating 20 is placed in order to make all the area in-between the electrode sensitive to touch events. In case there were no such a resistive coating, only the electrodes 40 would be sensitive to touch events which decreases the area that is effectively sensitive to touch events. Read-out can be both binary (as indicated in FIG. 2) or analog.

Since the coating is highly resistive, as the touch point gets away from the respective electrode, the signal associated to the touch event decouples from the respective electrode inasmuch as the stimulus becomes gradually irrelevant to the initial nearest electrode and becomes more relevant to the current nearest electrode.

The medium's resistivity (or practically the surface resistance) can be adjusted in such a way that the resistance is high enough in order to avoid that the adjacent sensor electrodes or collecting electrodes are short circuited and low enough to enable the highest possible pick-up/parasitic coupling of touch events.

An effective distance for the electrodes to provide a proper signal can be obtained by the formula:

$$E = \frac{d[n]}{\frac{\Omega}{\square}}$$

where E is the effective distance, d[n] is the distance between two adjacent electrodes 20, and $$\frac{\Omega}{\square}$$

is the sheet resistance of the resistive layer 20.

Figure 3:
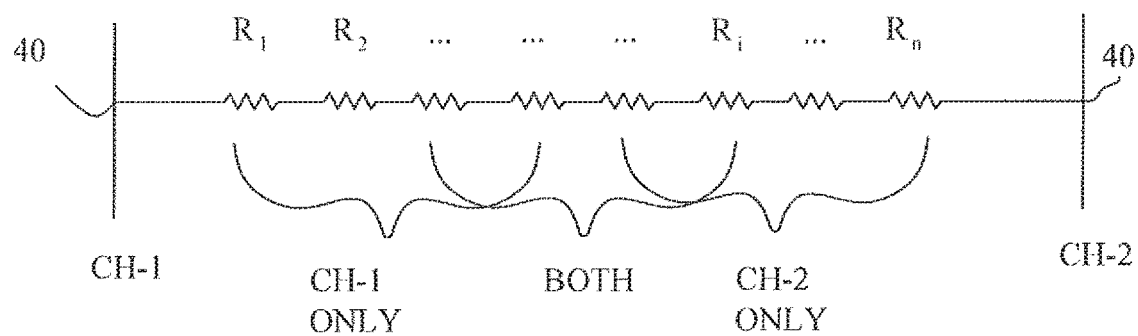
FIG. 3 shows a schematic model of an embodiment of the invention.

The above situation can be visualized with the aid of FIG. 3 that shows a schematic model of the embodiment of the invention depicted schematically in FIG. 2.

In the model, a series of resistive elements $R_i$ are placed in-between adjacent electrodes 40. As a touch event or the stimulus gets close to one of the electrodes, that electrode becomes more relevant and generates a higher output as a function of the proximity of the touch event to the electrode. Both channels (1 and 2) would fire concurrently when the stimulus is in the middle of the two electrodes. Read-out can be both binary or analog.

Figure 4:
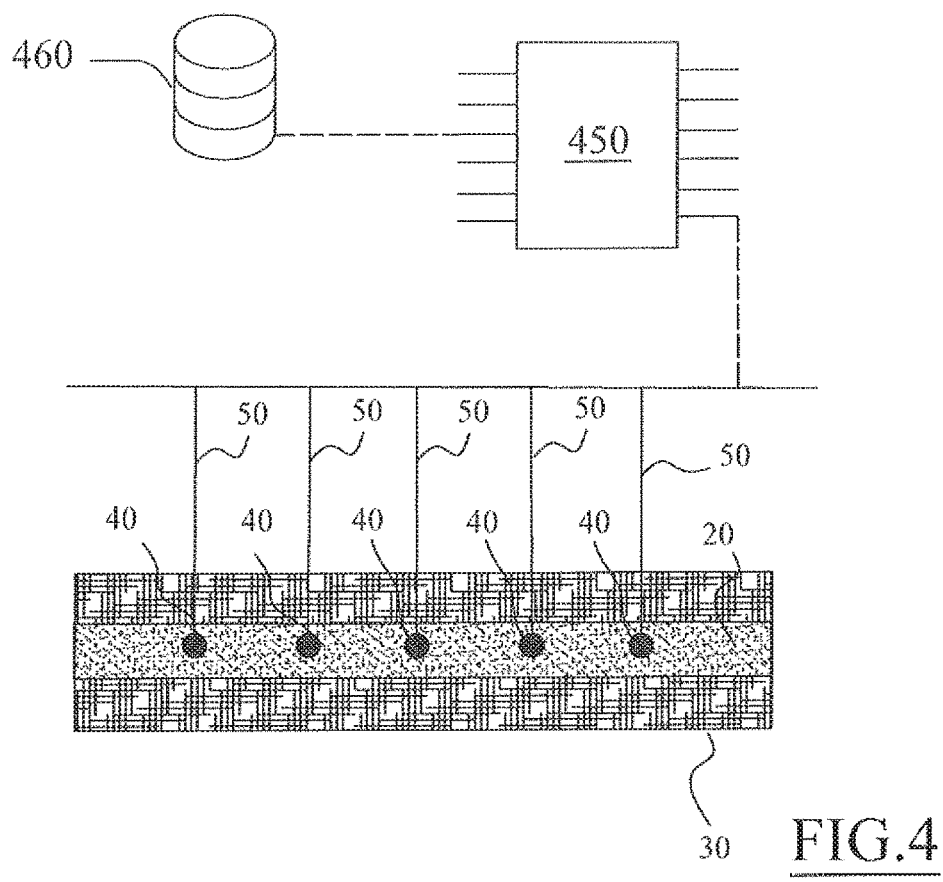
FIG. 4 shows a schematic view of an embodiment of the invention.

FIG. 4 shows a schematic view of an embodiment of the invention, in particular of a working prototype thereof.

A strip of fabric 30 is depicted, wherein the strip of fabric 30 is coated with a resistive coating 20, the resistive coating 20 also covering a plurality of electrodes 40.

Electrodes 40 are in turn connected to an Electronic Control Unit (ECU) 450 by means of respective connecting wires 50.

The ECU 450 may include a digital central processing unit (CPU) in communication with a memory system and an interface bus. The CPU is configured to execute instructions stored as a program in a memory system 460, and send and receive signals to/from an interface bus.

Figure 5:
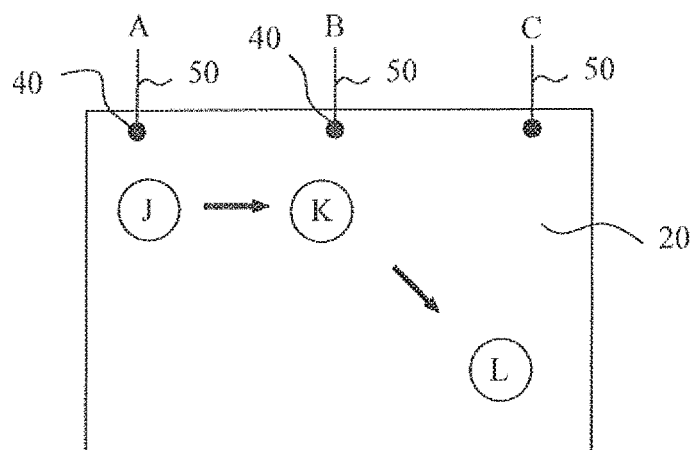
FIG. 5 shows a schematic model of another embodiment of the invention and of its possible use.
Figure 5:
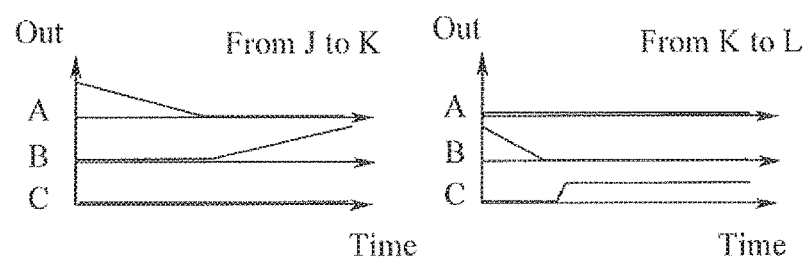

The prototype described allows to understand the working range of the invention. FIG. 5 shows a schematic model of another embodiment of the invention and of its possible use.

In FIG. 5, a piece of fabric is coated with resistive coating 20 and, as an example, three electrodes 40 are electrically connected to such resistive coating 20.

Each electrode 40 is connected by means of a respective connecting wire 50 to an ECU 450 (not represented for simplicity) in order to provide signals A, B and C.

The fabric used has no conducting yarn in it, there is no actual collecting or sensing electrode, but only a single piece of coated layer 20 which is connected to analog read-out electronics on the points equally distanced at arbitrarily selected one of the edges-only. Gestures applied on the sensitive square or rectangular region represented are picked up by the Electronic Control Unit (ECU) 450 and interpreted by the software stored in the memory system.

FIG. 5 shows also the logic of interpretation.

For example, if the ECU 450 detects a pattern of capacitive signals such as the one depicted in the lower left graph, the ECU 450 will interpret such pattern as a swipe gesture from point J to point K.

If the ECU 450 detects a pattern of signals such as the one depicted in the lower right graph, the ECU 450 will interpret such pattern as a swipe gesture from point K to point L.

Figure 6:
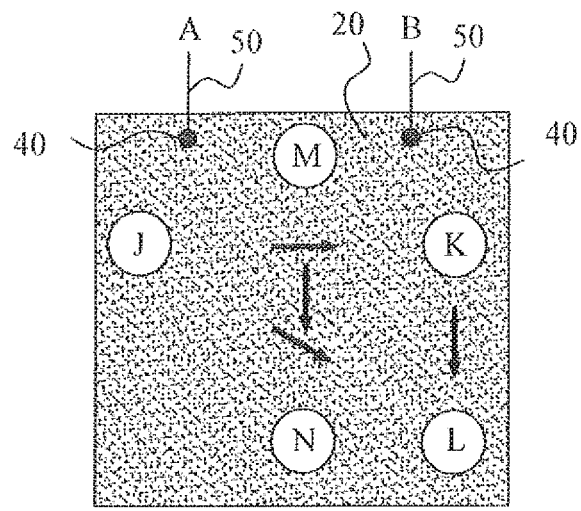
FIG. 6 shows a schematic model of still another embodiment of the invention and of its possible use.
Figure 6:
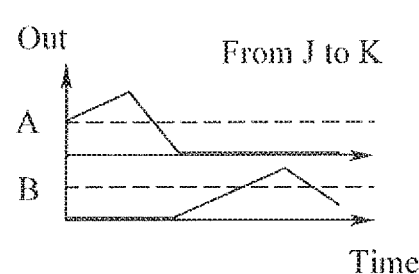
Figure 6:
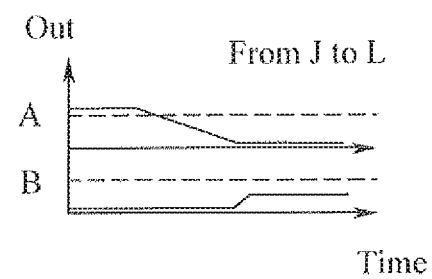
Figure 6:
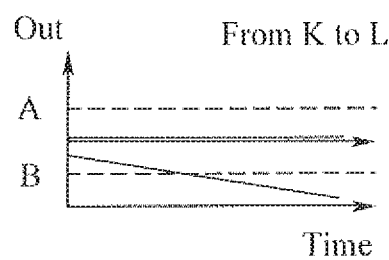
Figure 6:
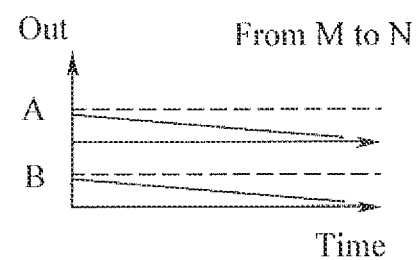

FIG. 6 shows a schematic model of still another embodiment of the invention and of its possible use.

In FIG. 6 a piece of fabric is coated with resistive coating 20 and, as an example, two electrodes 40 are electrically connected to such resistive coating 20.

Each electrode 40 is connected by means of a respective connecting wire 50 to an ECU 450 (not represented for simplicity) in order to provide signals A and B.

For example, if the ECU 450 detects a pattern of signals such as the one depicted in the higher left graph, the ECU 450 will interpret such pattern as a swipe gesture from point J to point K, while if the ECU 450 detects a pattern of signals such as the one depicted in the higher right graph, the ECU 450 will interpret such pattern as a swipe gesture from point J to point L.

If the ECU 450 detects a pattern of signals such as the one depicted in the lower left graph, the ECU 450 will interpret such pattern as a swipe gesture from point K to point L, while if the ECU 450 detects a pattern of signals such as the one depicted in the lower right graph, the ECU 450 will interpret such pattern as a swipe gesture from point M to point N.

Figures 7, 8:
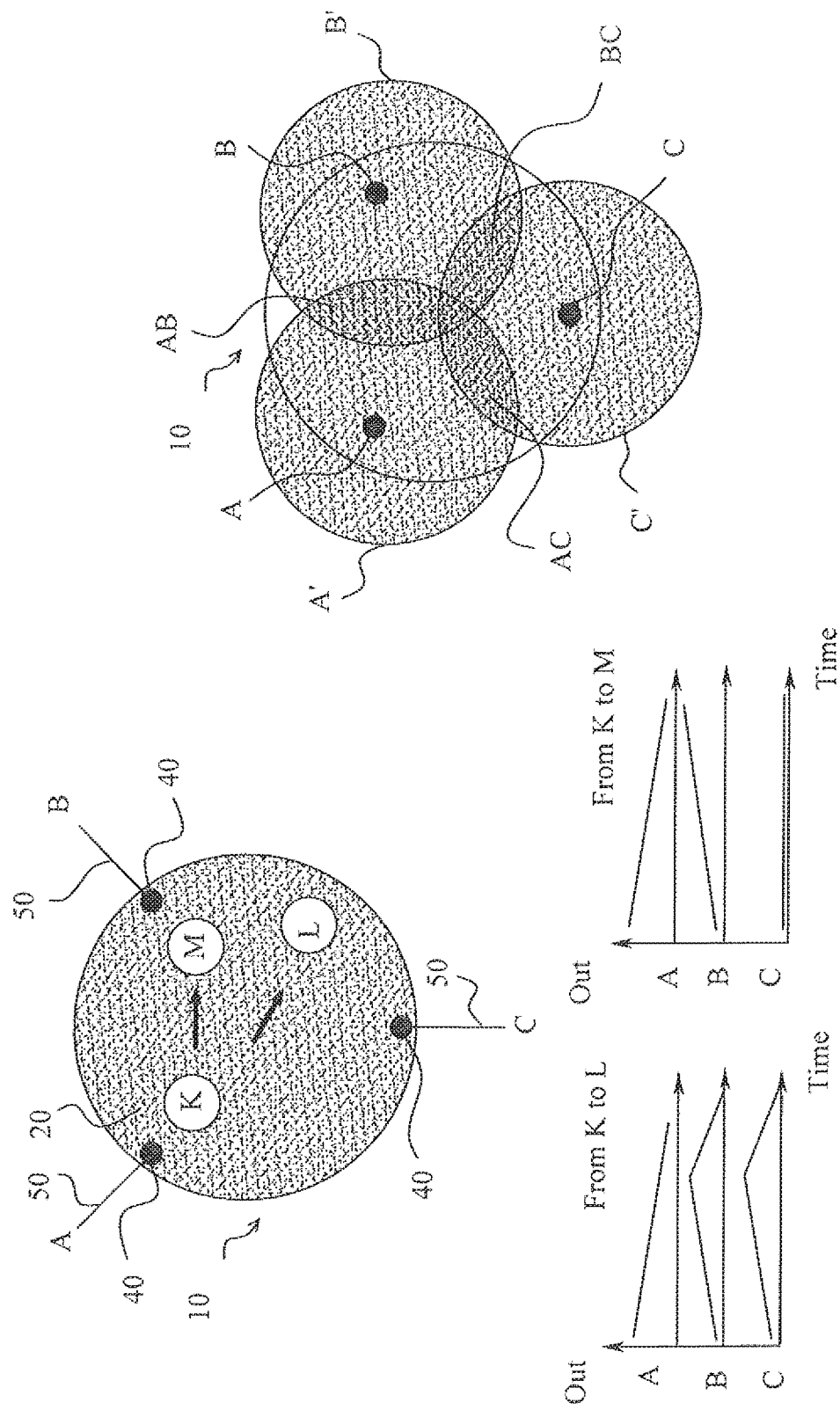
FIG. 7 shows a schematic model of a further embodiment of the invention and of its possible use.
FIGS. 8-10 show schematic representations of embodiments of the invention in terms of sensitivity boundaries.

FIG. 7 shows a schematic model of a further embodiment of the invention and of its possible use, in particular referring to a circular fabric sensor 10 provided with the high resistivity coating 20 and three electrodes 40 in electrical contact with such coating and placed at 120° each with respect to the other.

Each electrode 40 is connected by means of a respective connecting wire 50 to an ECU 450 (not represented for simplicity) in order to provide signals A, B and C.

For example, if the ECU 450 detects a pattern of signals such as the one depicted in the lower left graph, the ECU 450 will interpret such pattern as a swipe gesture from point K to point L.

If the ECU 450 detects a pattern of signals such as the one depicted in the lower right graph, the ECU 450 will interpret such pattern as a swipe gesture from point K to point M.

In general therefore a touch gesture is determined as a function of capacitance variations provided by the plurality of electrodes 40.

In particular, the touch gesture is interpreted by considering a value of capacitance provided by an electrode 40 as a measure of the proximity of said gesture to said electrode 40.

FIG. 8 shows a schematic representation of an embodiment of the invention in terms of sensitivity boundaries.

In FIG. 8 the fabric sensor 10 has a circular shape provided with the high resistivity coating and three electrodes A, B and C in electrical contact with such coating and placed at 120° each with respect to the other.

Each electrode A, B and C defines a respective area of influence A', B' and C' and sensitivity boundaries AB, AC and BC can be defined in such a way that, in any position on the sensor, a certain combination of signals is picked up depending on such position.

Figure 9:
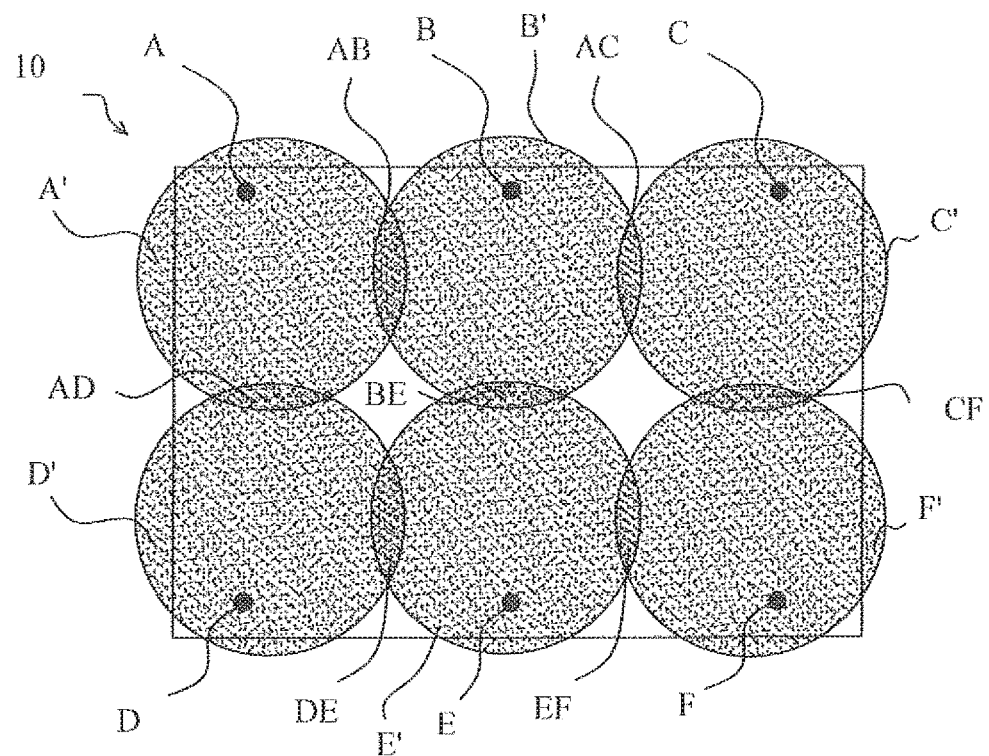

FIG. 9 shows a schematic representation of another embodiment of the invention in terms of sensitivity boundaries.

In FIG. 9 the fabric sensor 10 has a rectangular shape provided with the high resistivity coating and six electrodes A, B, C, D, E and F in electrical contact with such coating and placed at a distance each with respect to the other.

Each electrode defines a respective area of influence A', B', C', D', E' and F'' and sensitivity boundaries AB, AC, AD, DE, EF and CF can be defined in such a way that, in any position on the sensor, a certain combination of signals is picked up depending on such position.

Figure 10:
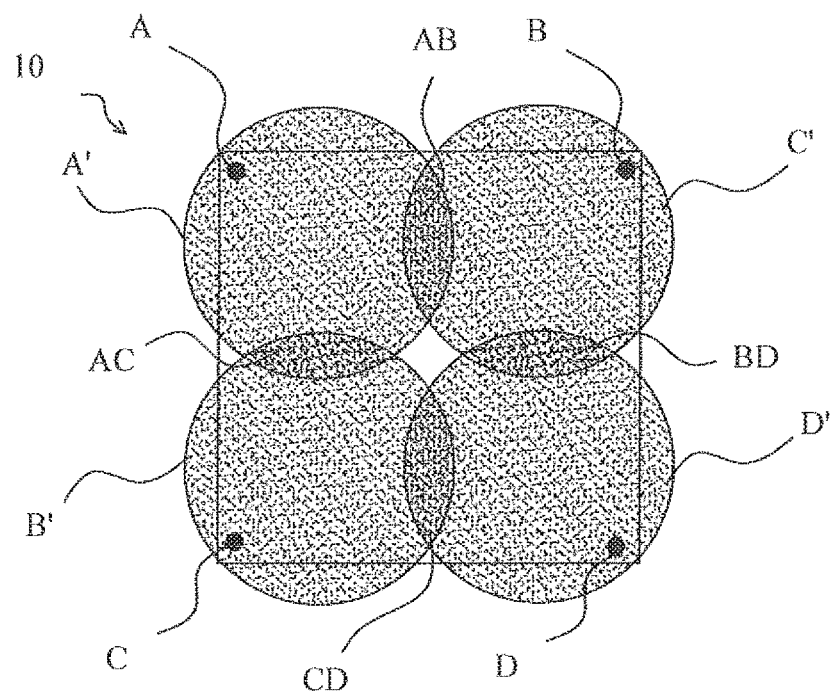

Finally, FIG. 10 shows a schematic representation of still another embodiment of the invention in terms of sensitivity boundaries.

In FIG. 10 the fabric sensor 10 has a square shape provided with the high resistivity coating and four electrodes A, B, C and D in electrical contact with such coating and placed at a distance each with respect to the other.

Each electrode defines a respective area of influence A', B', C' and D' and sensitivity boundaries AB, AC, BD and CD can be defined in such a way that, in any position on the sensor, a certain combination of signals is picked up depending on such position. In all figures, sensitivity boundaries are represented only for illustrative purposes only being it possible for the present invention to provide a capacitive fabric sensor that is active on its whole surface.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A capacity touch fabric sensor (10) comprising a fabric layer (30) and layer (20) of a highly resistive material coating, the resistive coating layer (20) coating the fabric layer (30), wherein the fabric sensor (10) further comprises a plurality of electrodes (40) superimposed to the fabric layer (30), the plurality of electrodes (40) being electrically coupled with the layer (20) of resistive material coating, each electrode (40) being connected by means of an electrical connection (50) to an electronic control unit (450), the electronic control unit (450) being configured to evaluate capacitance variation of the resistive layer that is indicative of a touch event on the capacity touch fabric sensor (10),
wherein a resistance of the highly resistive material coating of the resistive coating layer (20) is high enough in order to avoid that the adjacent electrodes (40) are short circuited and low enough to enable the highest possible pick-up of parasitic coupling of touch events and the capacitance variation evaluated by the electronic control unit (450) is a function of an effective distance between two electrodes (40), wherein said effective distance is calculated as a ratio between the distance between said two electrodes (40) and a sheet resistance of the resistive layer (20).

2. The capacity touch fabric sensor (10) of claim 1, wherein the resistive coating layer (20) is screen printed on the fabric layer (30).

3. The capacity touch fabric sensor (10) of claim 1, wherein the resistive coating layer is realized, at least in part, with a polymer selected from polyacrylates, polyamines and polyurethanes.

4. The capacity touch fabric sensor (10) of claim 1, wherein the resistive coating layer is realized, at least in part, with a biopolymer.

5. The capacity touch fabric sensor (10) of claim 4, wherein said biopolymer is selected from microbial cellulose, microbial collagen, cellulose/chitin copolymer, microbial silk, and mixture thereof.

6. The capacity touch fabric sensor (10) of claim 4, wherein an electrically conductive material is applied to said biopolymer, said electrically conductive material being a carbonaceous material, selected from a group consisting of activated carbon, high surface area carbon, graphene, graphite, activated charcoal, carbon nanotubes, carbon nanofibers, activated carbon fibers, graphite fibers, graphite nanofibers, carbon black and mixtures thereof.

7. The capacity touch fabric sensor (10) of claim 4, wherein said biopolymer is microbial cellulose.

8. The capacity touch fabric sensor (10) of claim 1, wherein the electrodes (40) are screen printed on the fabric layer (30).

9. The capacity touch fabric sensor (10) of claim 1, wherein the electrical connections (50) are connecting wires made from a material chosen from steel, nylon with carbon impurities, or copper and can be insulated or non-insulated.

10. The capacity touch fabric sensor (10) of claim 1, wherein the capacitance variation evaluated by the electronic control unit (450) is a function of a distance between the area of contact and the electrodes (40) and of an electrical resistivity of the resistive coating layer (20).

11. The capacity touch fabric sensor (10) of claim 1, wherein the fabric layer (30) is a woven fabric.

12. A garment that contains the fabric sensor (10) according to claim 1.

13. A method of detecting a touch event on a fabric sensor (10), the method comprising:
providing a fabric layer (30) on the fabric sensor (10);
providing a layer (20) of a highly resistive material coating, the resistive coating layer (20) coating the fabric layer (30);
providing a plurality of electrodes (40) superimposed to the fabric layer (30), the plurality of electrodes (40) being electrically coupled with the layer (20) of resistive material coating;
evaluating capacitance variations provided by the plurality of electrodes (40) using an electronic control unit (450);
determining a touch event as a function of capacitance variations provided by the plurality of electrodes (40), wherein
the capacitance variations evaluated by the electronic control unit (450) are a function of an effective distance between two electrodes (40), wherein said effective distance is calculated as a ratio between the distance between said two electrodes (40) and a sheet resistance of the resistive layer (20).

14. The method according to claim 13, wherein the touch event is interpreted by considering a value of capacitance provided by an electrode (40) as a measure of a proximity of said event to said electrodes (40).

15. A textile substrate for interpreting human gestures, the textile substrate comprising the capacity touch fabric sensor (10), said capacity touch fabric sensor (10) comprising the fabric layer (30) and layer (20) of the highly resistive material coating, the resistive coating layer (20) coating the fabric layer (30), wherein the fabric sensor (10) further comprises the plurality of electrodes (40) superimposed to the fabric layer (30), the plurality of electrodes (40) being in electrical contact with the layer (20) of resistive material coating, the capacity touch fabric sensor (10) being connected to an electronic control unit (450) configured to receive and interpret a data structure generated by a human gesture according to the method of claim 11 or 12.

* * * * *